(12) United States Patent
Schlabe et al.

(10) Patent No.: US 9,581,984 B2
(45) Date of Patent: Feb. 28, 2017

(54) ENERGY MANAGEMENT OF A SYSTEM ACCORDING TO AN ECONOMIC MARKET MODEL APPROACH

(71) Applicant: Deutsches Zentrum für Luft- und Raumfahrt e.V., Köln (DE)

(72) Inventors: Daniel Schlabe, München (DE); Dirk Zimmer, Wessling (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 475 days.

(21) Appl. No.: 13/973,448

(22) Filed: Aug. 22, 2013

(65) Prior Publication Data
US 2014/0058573 A1    Feb. 27, 2014

(30) Foreign Application Priority Data
Aug. 23, 2012 (DE) .................. 10 2012 107 788

(51) Int. Cl.
*G05B 15/02* (2006.01)
*H02J 3/00* (2006.01)

(52) U.S. Cl.
CPC .............. *G05B 15/02* (2013.01); *H02J 3/008* (2013.01); *Y04S 50/10* (2013.01)

(58) Field of Classification Search
CPC ........ H02J 2003/007; H02J 3/008; H02J 3/12; H02J 3/14; H02J 2003/143; G05B 15/02
USPC .................................................. 700/286, 287
See application file for complete search history.

(56) References Cited

U.S. PATENT DOCUMENTS

| | | | |
|---|---|---|---|
| 2006/0276938 A1* | 12/2006 | Miller | G06Q 50/06 700/295 |
| 2008/0059013 A1* | 3/2008 | Liu | B60K 6/48 701/22 |
| 2014/0172182 A1* | 6/2014 | Subbotin | H02J 3/383 700/291 |

OTHER PUBLICATIONS

Büchner, Stefan, "Energiemanagement-Strategien für elektrische Energiebordnetze in Kraftfahrzeugen", Dissertation, TU Dresden, Gottingen, Cuvillier Verlag, 2008, pp. 71-82.

* cited by examiner

*Primary Examiner* — Nathan L Laughlin
(74) *Attorney, Agent, or Firm* — Hoffmann & Baron, LLP (57) ABSTRACT

The invention relates to a method and to a device for the energy management of a system having a number of components according to an economic market model approach. At least one of the components is characterized by a non-monotonic price-performance or price-power relation. By taking into consideration the non-monotonic price-performance or price-power relation, a realistic description of the at least one component is provided and thus used to improve energy management of the system.

12 Claims, 6 Drawing Sheets

(Prior Art)

(Prior Art)

ENERGY MANAGEMENT OF A SYSTEM ACCORDING TO AN ECONOMIC MARKET MODEL APPROACH

CROSS-REFERENCE TO RELATED APPLICATIONS

This application claims priority to German Application No. 10 2012 107 788.6 filed on 23 Aug. 2012, the contents of which are incorporated herein by reference in their entirety.

BACKGROUND

Field of Technology

The invention relates to a method and to a device for the energy management of a system according to an economic market model approach.

Brief Description of Related Art

The use of a market model approach known from economics for the energy management of systems is known in principle. Thus, a market model approach with price-performance curves for the energy management of, for example, an electrical system in a motor vehicle is known from: Stefan Büchner, "Energiemanagement-Strategien für elektrische Energiebordnetze in Kraftfahrzeugen" Dissertation TU Dresden, 2008, or from: A. Engstle, "Energiemanagement in Hybridfahrzeugen" Dissertation TU Munich, 2008. Moreover, a market model approach for the performance management of distribution networks is known from: Fredrik Ygge, "Market-Oriented Programming and its Application to Power Management" PHD Thesis, Llund University, Sweden, 1998.

In the known methods for the energy management of a system according to an economic market model approach, price-performance curves (cost functions) are assigned to individual components of the system. For energy sources, these price-performance curves increase monotonically in the prior art, while for energy consumers these price-performance curves decrease monotonically in the prior art. However, in practice, the components of an energy system behave in part in such a way that a realistic description of the components leads to non-monotonic, multivalued price-performance curves.

SUMMARY

The invention provides a method and a device for the energy management of a system according to an economic market model approach which allow a more realistic, improved consideration of properties of components of the system and thus an improved energy management.

The invention results from the features of the independent claims. Advantageous variants and embodiments are the subject matter of the dependent claims. Additional features, application possibilities and advantages of the invention result from the following description and from the explanation of embodiment examples of the invention that are represented in the figures.

The method-related aspect of the problem is solved by a method for the energy management of a system according to an economic model approach, wherein the system has a number z of components which comprise at least: one number e of energy sources $Q_a$ and one number f of loads $L_b$, where: $a \in 1, 2, \ldots, a1$; $b \in 1, 2, \ldots, b1$; $z=a1+b1$ and $j$, $t \in 1$, $2, \ldots, z$.

The system is preferably an electrical system, in particular, an electrical system of a vehicle, a ship, an airplane, or a spacecraft. Alternatively, the system is preferably a thermodynamic system, in particular, an air conditioning or heating or cooling system, a mechanical system, a chemical system, a biological system, or a combination thereof.

In addition, the z components preferably comprise: settable loads and/or switchable loads and/or settable and switchable loads and/or energy transformers and/or power limiters and/or power splitters and/or power change limiters and/or energy sinks and/or energy lines.

The method according to the invention comprises the following process steps.

In a first step, an assignment of an individual price-performance relation $PR_j$ to each one of the z components of the system occurs, relation which assigns prices to performances delivered or received from the given $j^{th}$ component, wherein each one of the price-performance relations $PR_j$ is represented by a curve $k_j$, in which the performance values $m_j$ delivered or received by the respective $j^{th}$ component are plotted above price values $p_j$, wherein at least one such price-performance relation $PR_{j=t}$ is represented by such a non-monotonic curve $k_t^*$, and all additional price-performance relations $PR_{j \neq t}$ are represented by such monotonic curves $k_{j \neq t}$.

The term "price relation" thus-comprises particularly assignments of performance values $m_j$ and price values $p_j$ which are not monotonic and multivalued, i.e., which can be represented by a non-monotonic, multivalued curve. The method according to the invention is thus characterized in the first step in that, in contrast to the prior art, at least one component of the system is characterized by such a non-monotonic curve $k_t^*$. By taking into consideration such non-monotonic price-performance relations for the characterization of the components of the system, the description of the individual components becomes realistic, and, during the further course of the method, it results in an improved energy management of the system.

In a second step, an approximation of the non-monotonic curve $k_t^*$ by a first monotonic approximation curve $K_{n=1,t}$ occurs, curve which thus represents a first monotonic approximation relation $N_{n=1}$ $(PR_{j=t})$ for the non-monotonic price-performance relation $PR_{j=t}$. The index n here is an iteration index which starts in the second step at 1 (n=1) and which is increased during the further course of the process in each case by 1.

The determination of the approximation curve $K_{n=1,t}$ in the second step occurs, in a particularly preferred variant of the method according to the invention, in such a way that, for all points $(m_{Kn=1,t}, p_{Kn=1,t})$ of the approximation curve $K_{n=1,t}$, it is true that:

the performance value $m_{Kn=1,t}$ for a price $p_{Kn=1,t}$ is greater than or equal to all the performance values $m_{kt}^*$ of the non-monotonic curve $k_t^*$ at this price $p_{Kn=1,t}$, and the approximation curve $K_{n=1,t}$ is the curve which, under the above condition, has the smallest difference with respect to the non-monotonic curve $k_t^*$.

Consequently, after the second step, for all the components of the system, monotonic curves or monotonic price-performance relations exist: i.e., besides the curves $k_{j \neq t}$ which are monotonic in any case, the monotonic approximation curve $K_{n=1,t}$ approximates the non-monotonic curve $k_t^*$. Naturally, it is also possible to characterize several components of the system by non-monotonic price-performance relations $PR_j$ or non-monotonic curves $k_j$.

In a third step, on the basis of the z price-performance relations $PR_j$, wherein the first approximation relation $N_{n=1}$ ($PR_{j=t}$) is used instead of the price-performance relation $PR_{j=t}$, a determination of a first equilibrium price $p_{n=1}$ and of an associated equilibrium performance $m_{n=1}$ for the system occurs. Consequently, for determining the equilibrium performance $m_{n=1}$ and the equilibrium price $p_{n=1}$, monotonic price-performance relations PR or monotonic curves are used exclusively. The determination of an equilibrium price and of an assigned value (here: equilibrium performance) from several price relations/cost curves is known in the prior art, and it is based, for example, on determining, after the summation of all the monotonically increasing curves (or the sum of all the energy source curves) and the subsequent summation of all the monotonically decreasing curves (for example, sum of all the loads), the intersection of the two sum curves. The intersection establishes the equilibrium price and the equilibrium performance.

In a fourth step, an approximation of the non-monotonic curve $k_t^*$ by an additional monotonic approximation curve $K_{n+1,t}$ occurs, the latter curve thus representing an $(n+1)^{th}$ approximation relation $N_{n+1}(PR_{j=t})$ for the non-monotonic price-performance relation $PR_{j=t}$. With the fourth step, an iterative improvement of the first monotonic approximation curve $K_{n=1,t}$ according to a predetermined iteration criterion starts.

It is preferable for the fourth step to comprise the following substeps. In a first substep of the fourth step, for the last equilibrium performance $m_n$ determined in the method on the basis of the non-monotonic curve $k_t^*$, a price value $p_{kt}^*(m_n)$ assigned to this equilibrium performance $m_n$ is determined. For the first performance of the fourth step, the equilibrium performance $m_{n=1}$ is determined beforehand in the third step, so that now the assigned price value $p_{kt}^*(m_{n=1})$ can be determined on the basis of the non-monotonic curve $k_t^*$.

In a second substep of the fourth step, the approximation curve $K_{n+1,t}$ is now determined in such a way that it is true that:

the approximation curve $K_{n+1,t}$ comprises the point $(m_n, p_{kt}^*(m_n))$, for all points $(m_{Kn+1,t}, p_{Kn+1,t})$ of the approximation curve $K_{n+1,t}$ for which $p_{Kn+1,t} > p_{kt}^*(m_n)$, the performance values $m_{Kn+1,t}$ assigned to the price values $p_{Kn+1,t}$ are smaller than or equal to the performance values $m_{kt}^*$ of the non-monotonic curve $k_t^*$, whose performance values $m_{kt}^*$ are greater than $m_n$, for all points $(m_{Kn+1,t}, p_{Kn+1,t})$ of the approximation curve $K_{n+1,t}$ for which $p_{Kn+1,t} < p_{kt}^*(m_n)$, the performance values $m_{Kn+1,t}$ assigned to the price values $p_{Kn+1,t}$ are greater than or equal to the performance values $m_{kt}^*$ of the non-monotonic curve $k_t^*$, and the approximation curve $K_{n+1,t}$ is the curve which, under the above (three) conditions, has the smallest difference with respect to the non-monotonic curve $k_t^*$.

For the case where, for the last determined equilibrium performance $m_n$, a price value $p_{kt}^*(m_n)$ assigned to this equilibrium performance $m_n$ cannot be determined on the basis of the non-monotonic curve $k_t^*$, for example, because no value for $m_n$ is defined in the non-monotonic curve $k_t^*$, the fourth step of the method according to the invention preferably comprises the following substeps.

In a first substep of the fourth step, the approximation curve $K_{n+1,t}$ is determined in such a way that it is true that:

the non-monotonic curve $k_t^*$ is limited to a curve $k_{tb}^*$, wherein the latter curve is defined in that it contains only the points of the curve $k_t^*$ whose performance values are either all greater than or all smaller than $m_n$, and the determination of the approximation curve $K_{n+1,t}$ occurs in such a way that, for all points $(m_{Kn+1,t}, p_{Kn+1,t})$ of the approximation curve $K_{n+1,t}$, it is true that: the performance value $m_{Kn+1,t}$ for a price $p_{Kn+1,t}$ is greater than or equal to all performance values $m_{ktb}^*$ of the non-monotonic curve $k_{tb}^*$ at this price $p_{Kn+1,t}$, and the approximation curve $K_{n+1,t}$ is the curve which, under the above (two) conditions, has the smallest difference with respect to the non-monotonic curve $k_{tb}^*$.

The preferred variant of the method, indicated here for the second process step, is thus used in the fourth step for determining the approximation curve $K_{n+1,t}$, wherein, in the present fourth step, the steps of the preferred variant of the second step are applied to the limited curve $k_{tb}^*$ instead of the non-monotonic curve $k_t^*$, and wherein, in all the subsequent process steps, only $k_{tb}^*$ instead of $k_t^*$ is used.

In a fifth step of the method according to the invention, on the basis of the z price-performance relations $PR_j$, wherein the approximation relation $N_{n+1}(PR_{=t})$ is used instead of the price-performance relation $PR_{j=t}$, a determination of an $(n+1)^{th}$ equilibrium performance $m_{n+1}$ and of an associated equilibrium price $p_{n+1}$ for the system occurs. The determination of the equilibrium performance $m_{n+1}$ and of the equilibrium price $p_{n+1}$ occurs, for example, as described above.

In a sixth step, a repeated run through the fourth and fifth steps takes place for the iterative determination of an approximation relation $\underline{N}_{n+1}(PR_{j=t})$ or of a curve representing said approximation relation, until a predetermined best match criterion is satisfied.

In a seventh step, a control of individual components or of all the components of the system occurs on the basis of a predetermined energy demand of the loads $L_b$ and of the equilibrium performance $m_{n+1}$ and equilibrium price $p_{n+1}$ determined on the basis of the V. The term "control" is used here in its broad meaning. It includes, for example, regulating/controlling individual components, switching individual components on and off, changing the interconnection of the components in the system, etc.

The method according to the invention thus allows an energy management of a system according to an economic market model approach, wherein individual components of the system are described by a non-monotonic, multivalued price-performance relation. Typically, the proposed method leads to a rapid convergence, so that an adequate approximation relation $\underline{N}_{n+1}(PR_{j=t})$ can be determined within several operation steps. The embodiments of the invention indicated as preferred variants are in addition reliably robust and they are therefore suitable for the energy management of systems that have to satisfy stringent safety requirements. The method according to the invention here is particularly suitable for the energy management of electrical systems or thermodynamic systems (for example, air conditioning installations) of airplanes, spacecraft or motor vehicles.

An additional preferred variant of the method according to the invention is characterized in that the individual price-performance relations $PR_j$ of the components are time dependent. Thus, for example, the circumstance of an aging of the component can be taken into consideration in the context of the energy management.

An additional preferred variant of the method according to the invention is characterized in that the individual price-performance relations $PR_j$ are dependent on a state of the system and/or a state of the respective components. Thus, it is possible to take into consideration, for example, different interconnection states of the components of the system or, for example, state changes of individual components (for example, caused by changed operating temperatures, operating pressures, etc.), which take into consideration a correspondingly changed individual price-performance relations $PR_j$ of the components in question.

An additional preferred variant of the method according to the invention is characterized in that the individual price-performance relations $PR_j$ are dependent on the components of priorities that are assigned individually in each case, wherein the individual priorities are temporally variable, and the priorities are not identical at any time.

These priorities define, for example, the importance of a component for the system, and thus, for example, the importance of supplying these components with sufficient energy, or of using a component as energy source. The individual priorities preferably have a hierarchical priority comprising in each case a first priority P1 and a second priority P2.

If the system has, for example, a number y of switchable loads, then a number y of first priorities $P1_y$ and a number y of second priorities $P2_y$ are available for the establishment of the individual priority of the y switchable loads. An initial priority ($P1_y$ and $P2_y$) of each switchable load can be determined, for example, by a detailed load analysis, which takes into consideration the importance of the respective switchable load and the effect of its loss. It is preferable for the first priorities $P1_y$ to be variable and the second priorities $P2_y$ to be fixed. Since $P1_y$ should predominate, $P2_y$ determines the priority only in situations where P1 is identical for two components (for example, $P1_{y=3}=P1_{y=6}$). The changing priorities of the components can dramatically change the individual price-performance relations $PR_j$ of the affected components, so that taking into consideration the priorities of the components of the system allows a considerably improved energy management.

The device-related aspect of the problem is solved by a device for the energy management of a system according to an economic market model approach, wherein the system comprises a number z of components which comprise at least: one number e of energy sources $Q_a$ and one number f of loads $L_b$, where: $a \in 1, 2, \ldots, a1$; $b \in 1, 2, \ldots, b1$; $z=a1+b1$ and j, $t \in 1, 2, \ldots, z$.

The device according to the invention comprises a first means, by means of which an individual price-performance relation $PR_j$ can be assigned to each one of the z components of the system, relation which assigns prices to the performances delivered or received by the respective $j^{th}$ component, wherein each one of the price-performance relations $PR_j$ is represented by a curve $k_j$, in which performance values $m_j$ delivered or received by the respective $j^{th}$ component are plotted above price values $p_j$, wherein at least one such price-performance relations $PR_{j=t}$ is represented by such a non-monotonic curve $k_t^*$, and all additional price-performance relations $PR_{j \neq t}$ are represented by such monotonic curves $k_{j \neq t}$.

Moreover, the device according to the invention comprises the following means: a second means, which is designed and arranged in order to approximate the non-monotonic curve $k_t^*$ by a first monotonic approximation curve $K_{n=1,t}$, which thus represents a first monotonic approximation relation $N_{n=1}(PR_{j=t})$ for the non-monotonic price-performance relation $PR_{j=t}$; a third means which is designed and arranged in order to determine, on the basis of the z price-performance relations $PR_j$, wherein the first approximation relation $N_{n=1}(PR_{j=t})$ is used instead of the price-performance relation $PR_{j=t}$, a first equilibrium price $p_{=1}$ and an associated equilibrium performance $m_{n=1}$ for the system; a fourth means, which is designed and arranged in order to approximate the non-monotonic curve $k_t^*$ by an additional monotonic approximation curve $K_{n+1,t}$ which thus represents an $(n+1)^{th}$ monotonic approximation relation $N_{n+1}(PR_{j=t})$ for the non-monotonic price-performance relation $PR_{j=t}$; a fifth means, which is designed and arranged in order to determine on the basis of the z price-performance relations $PR_j$, wherein the approximation relation $N_{n+1}(PR_{j=t})$ is used instead of the price-performance relation $PR_{j=t}$, an $(n+1)^{th}$ equilibrium performance $m_{n+1}$ and an associated equilibrium price $p_{n+1}$ for the system; a sixth means connected to the fourth and fifth means, which is designed in order to determine iteratively an approximation relation $N_{n+1}(PR_{j=t})$ which satisfies a predetermined best match criterion, and a seventh means, which is designed and arranged in order to determine individual components or all the components of the system on the basis of a predetermined energy demand of the loads $L_b$ and of an equilibrium performance $m_{n+1}$, determined on the basis of the equilibrium relation $N_{n+1}(PR_{j=t})$, and of the equilibrium price $p_{n+1}$.

Preferred variants of the method according to the invention result from a similar application of the explanations made regarding the method according to the invention to the device according to the invention.

Additional advantages, features and details result from the following description, in which embodiment examples are described in reference to the drawings.

DETAILED DESCRIPTION

Figure 1A:
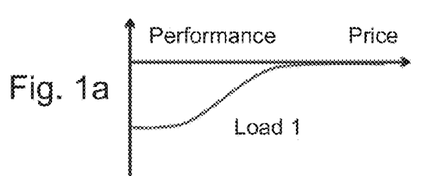
FIGS. 1a-e (prior art) show examples of monotonic price-performance relations for a system with three loads and two energy sources.
Figure 1B:
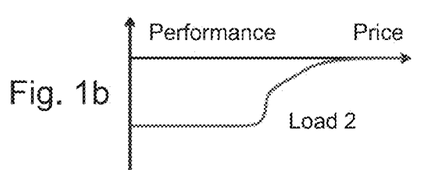
Figure 1C:
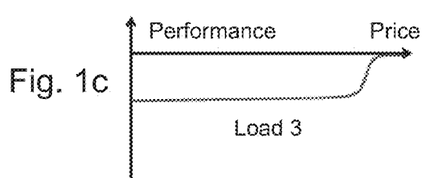
Figure 1D:
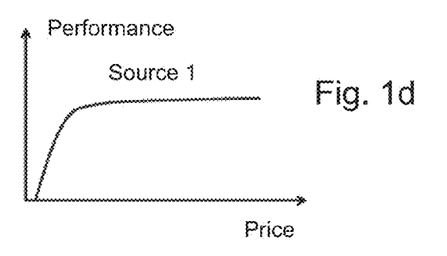
Figure 1E:
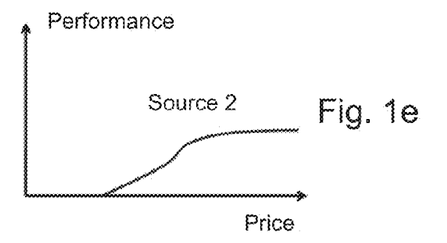
Figure 2:
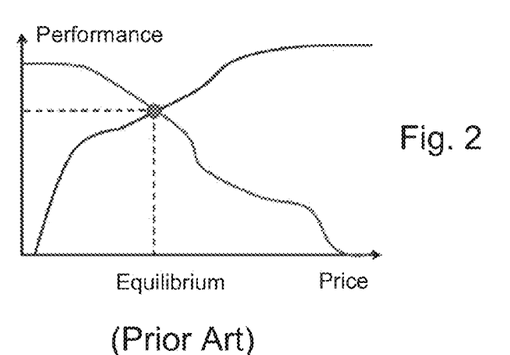
FIG. 2 (prior art) shows a representation for explaining the determination of an equilibrium price and of an equilibrium performance for the system with the components of FIGS. 1a-e.

FIGS. 1a-e show examples of monotonic price-performance or price-power relations which are represented as performance or power over price curves, for a system with three loads (loads 1-3) and two energy sources (sources 1-2), as known in the prior art. FIG. 2 shows a representation for explaining the determination of an equilibrium price and of an equilibrium performance or equilibrium power for the system with the components of FIGS. 1a-e. For this purpose, the monotonically decreasing sum curve of the loads 1-3 and the monotonically increasing sum curve of the sources 1-2 are determined. In FIG. 2, these two sum curves are plotted in the price-performance graph. The equilibrium price and the equilibrium performance are obtained from the intersection of the two sum curves.

Figure 3:
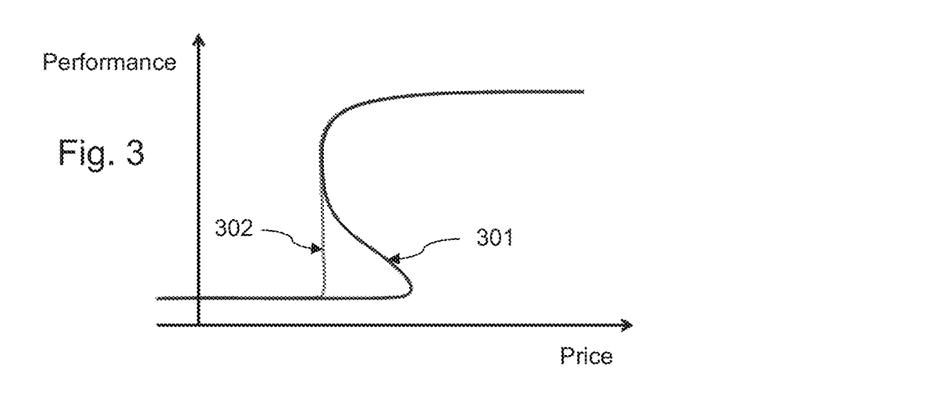
FIG. 3 shows a diagrammatic representation for determining a first monotonic approximation curve $K_{n=1,t}$ 302 with respect to the non-monotonic curve $k_t^*$ 301.

FIG. 3 shows a diagrammatic representation for determining a first monotonic approximation curve $K_{n=1,t}$ 302 with respect to a non-monotonic, multivalued curve $k_t^*$ 301 of a component of the system. Here, the first approximation curve $K_{n=1,t}$ 302 is determined in such a way that for all points ($m_{Kn=1,t}$, $p_{Kn=1,t}$) of the approximation curve $K_{n=1,t}$ 302 it is true that: the performance or power value $m_{Kn=1,t}$ for a price $p_{Kn=1,t}$ is greater than or equal to all the load values $m_{kt}^*$ of the non-monotonic curve $k_t^*$ 301 at this price $p_{Kn=1,t}$, and the approximation curve $K_{n=1,t}$ 302 is the curve which, under the above condition, has the smallest difference with respect to the non-monotonic curve $k_t^*$ 301.

Figure 4:
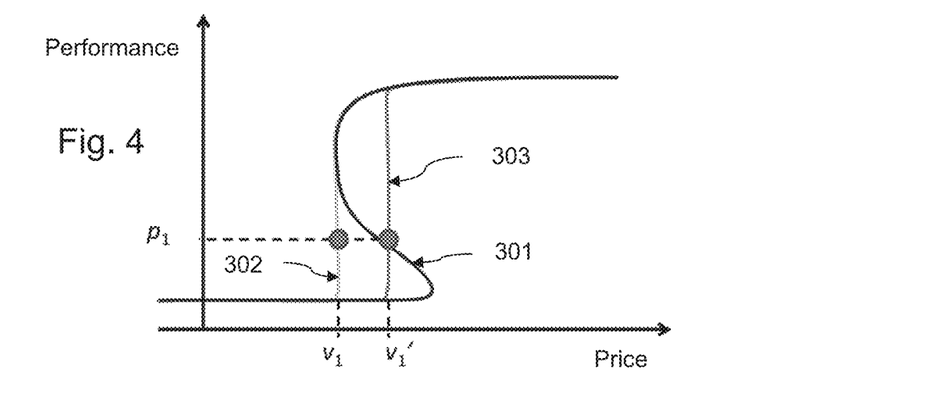
FIG. 4 shows a diagrammatic representation for determining a second monotonic approximation curve $K_{n=2,t}$ 303 with respect to the non-monotonic curve $k_t^*$ 301.

FIG. 4 shows a diagrammatic representation for determining a second monotonic approximation curve $K_{n+1,t}=K_{n=2,t}$ 303 with respect to the non-monotonic curve $k_t^*$ 301. For this purpose, for the last determined equilibrium performance $m_{n=1}$ 304, a price value $p_{kt}^*(m_{n=1})$ 305 assigned to this equilibrium performance $m_n$ is determined on the basis of the non-monotonic curve $k_t^*$ 301.

Subsequently, the approximation curve $K_{n=2,t}$ 303 is determined in such a way that it is true that:

the approximation curve $K_{n=2,t}$ 303 comprises the point ($m_{n=1}$, $p_{kt}^*(m_{n=1})$), (304, 305), for all points ($m_{Kn+2,t}$, $p_{Kn+2,t}$) of the approximation curve $K_{n=2,t}$ 303 for which $p_{Kn+2,t}>p_{kt}^*(m_{n=1})$, the performance values $m_{Kn=2,t}$ assigned to the price values $p_{Kn=2,t}$ are smaller than or equal to the performance values $m_{kt}^*$ of the non-monotonic curve $k_t^*$, whose performance values $m_{kt}^*$ are greater than $m_{n=1}$, for all points ($m_{Kn=2,t}$, $p_{Kn=2,t}$) of the approximation curve $K_{n=2,t}$ 303 for which $p_{Kn=2,t}<p_{kt}^*(m_{n=1})$, the performance values $m_{Kn=2,t}$ assigned to the price values $p_{Kn=2,t}$ are greater than or equal to the performance values $m_{kt}^*$ of the non-monotonic curve $k_t^*$, and the approximation curve $K_{n=21,t}$ is the curve which, under the above conditions (the above three bullet points) has the smallest difference with respect to the non-monotonic curve $k_t^*$.

Figure 5:
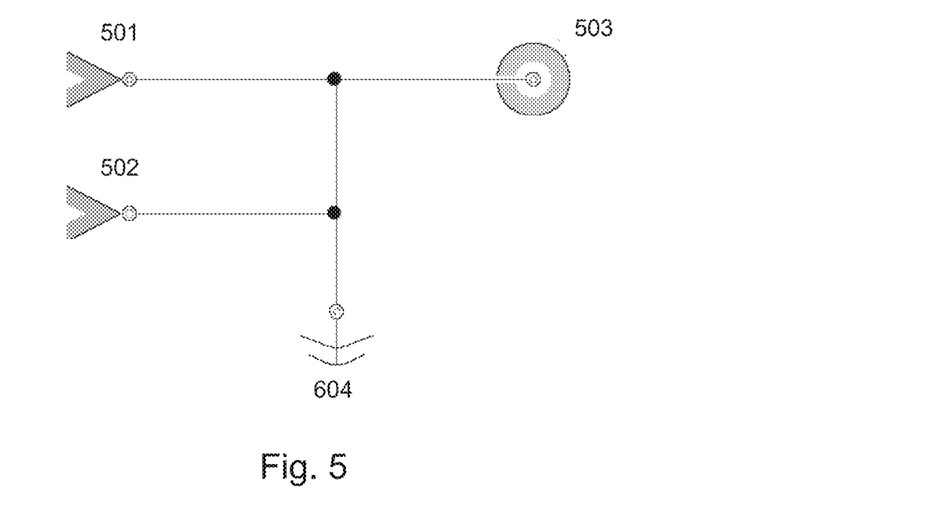
FIG. 5 shows an example of an electrical system including two generators (a small and a large generator with corresponding different performance yield and characteristics lines) and a consumer.

FIG. 5 shows an example of an electrical system including two current generators, a small generator 501 and a large generator 502 having correspondingly different performance or power yields and characteristic lines, and a consumer 503. In this example, the two generators 501 and 502 satisfy the performance demand of a consumer. The small generator 501 is less efficient in comparison to the large generator 502 and it is limited in its performance capacity. The large generator 502 is highly efficient at high performances, but highly inefficient at low performances. This means that the small generator 501 must be used in particular to fill in gaps in the efficiency of the large generator 502 at low performances.

Figure 6:
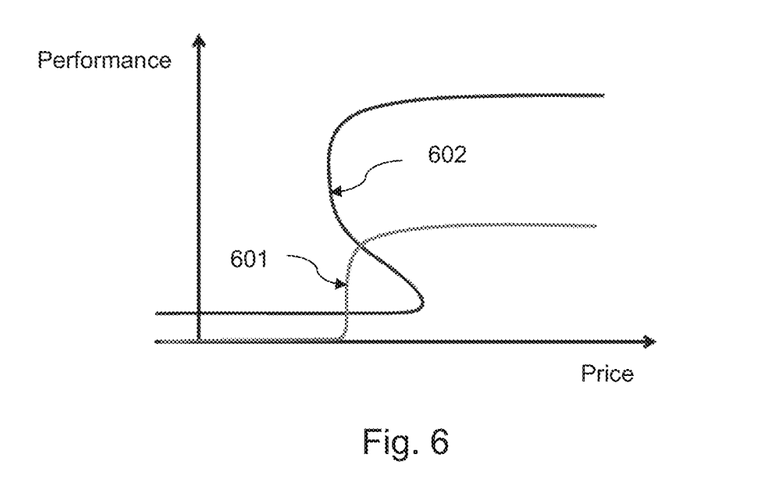
FIG. 6 shows the price-performance relations assigned to the two generators of FIG. 5.

FIG. 6 shows the price-performance relations assigned to the current generators 501 and 502. Here, the price-performance relation 601 is assigned to the small current generator 501, and the price-performance relation 602 is assigned to the large current generator. As one can easily see, the price-performance relation 602 is represented by a non-monotonic curve.

The method according to the invention is now applied to this example system. Here, the number of the equilibrium prices/equilibrium performances (including negotiation rounds) is limited to four in the current market model. In other words, the market model comprises four parallel market models, which are valid in each case in one of the negotiation rounds. The term "negotiation round" is used here as a synonym for determining an equilibrium price-equilibrium performance in a market model.

Figure 7:
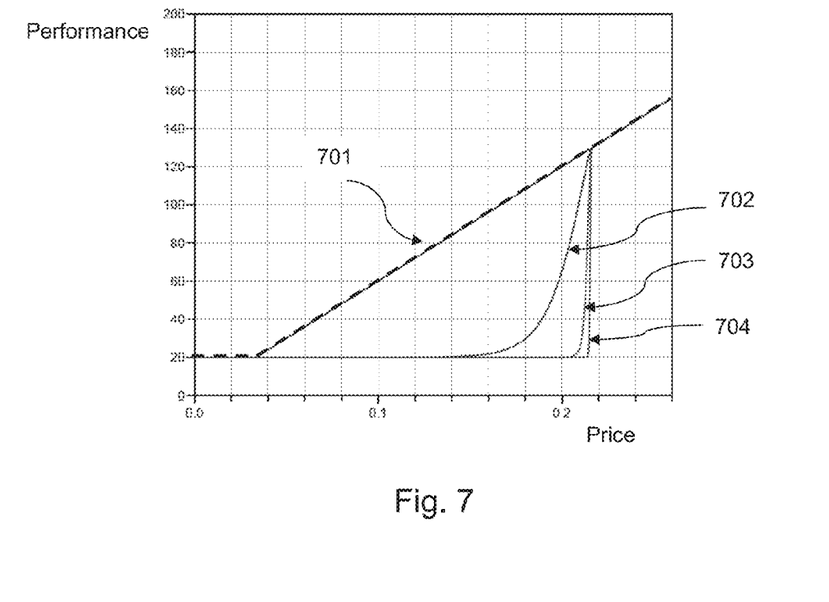
FIG. 7 shows the performance delivery of the large generator for n=4 iterations of the method according to the invention.

It is assumed here that the performance or power demand increases at a constant rate. By using the method, one gets the performance or power deliveries of the generators 501, 502, which are represented in FIG. 6 and FIG. 7. Here, FIG. 7 shows the performance delivery of the large generator 502 for in each case the four negotiation rounds of the method according to the invention (MAX(n)=4), and FIG. 8 shows the performance delivery of the small generator 501 for the respective four negotiation rounds of the method according to the invention.

Figure 8:
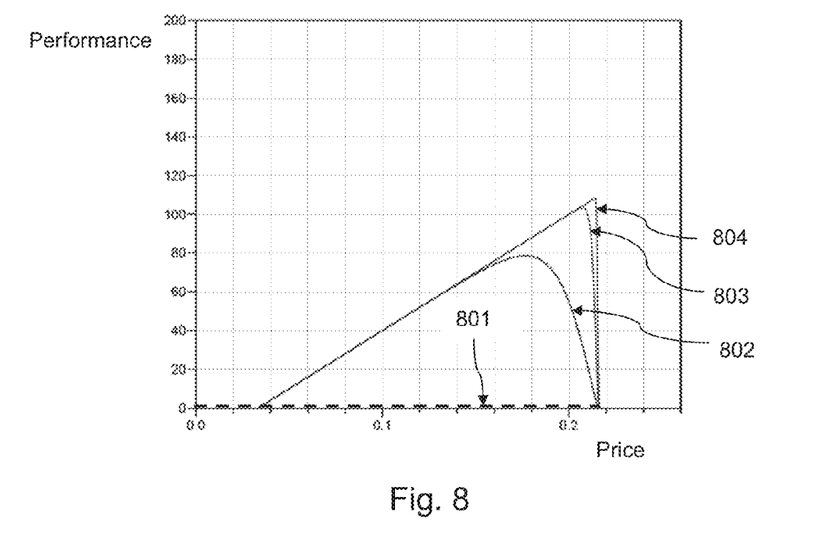
FIG. 8 shows the performance delivery of the small generator for n=4 iterations of the method according to the invention.

After the first negotiation round, one gets the curve 701 in FIG. 7 or the curve 801 in FIG. 8. After the second negotiation round, one gets the curves 702 or 802. After the third negotiation round, one gets the curves 703 or 803. After the fourth negotiation round, one gets the curves 704 or 804.

After the first negotiation round (n=1), the large generator 502 is actuated in such a way that it displaces the small generator 501. Starting with the second negotiation round (n=2), in the lower performance range, the small generator 501 is also used. After the fourth treatment round (n=4), the result shows a nearly discrete switching off of the small generator 501 and the simultaneous switching of the large generator 502, as soon as the large generator 502 is more efficient than the small generator 501.

Figure 9:
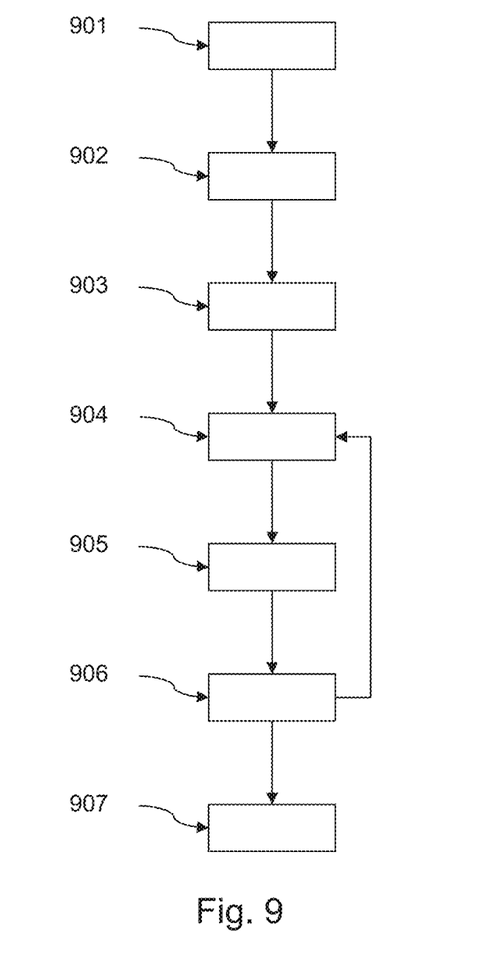
FIG. 9 shows a diagrammatic process course of a method according to the invention.

FIG. 9 shows a diagrammatic course diagram of a method according to the invention for the energy management of a system according to an economic market model approach, wherein the system comprises a number z of components which comprise at least: one number e of energy sources $Q_a$ and one number f of loads $L_b$, where: a∈1, 2, . . . , a1; b∈1, 2, . . . , b1; z=a1+b1 and j, t∈1, 2, . . . , z. The method according to the invention comprises the following steps. In a step 901, an assignment of an individual price-performance relation $PR_j$ to each one of the z components of the system occurs, relation which assigns prices to the performances delivered or received by the respective $j^{th}$ component, wherein each one of the price-performance relations $PR_j$ is represented by a curve $k_j$, in which performance values $m_j$ delivered or received by the respective $j^{th}$ component are plotted above price values $p_j$, wherein at least one such price-performance relation $PR_{j=t}$ is represented by such a non-monotonic curve $k_t^*$, and all additional price-performance relations $PR_{j\neq t}$ are represented by such monotonic curves $k_{j\neq t}$. In a step 902, an approximation of the non-monotonic curve $k_t^*$ by a first monotonic approximation curve $K_{n=1,t}$ occurs, which thus represents a first monotonic approximation relation $N_{n=1}(PR_{j=t})$ for the non-monotonic price-performance relation $PR_{j=t}$. In a step 903, on the basis of the z price-performance relations $PR_j$, wherein the first approximation relation $N_{n=1}(PR_{j=t})$ is used instead of the price-performance relation $PR_{j=t}$, a determination of a first equilibrium price $p_{n=1}$ and of an associated equilibrium performance $m_{n=1}$ for the system occurs. In a step 904, an approximation of the non-monotonic curve $k_t^*$ by an additional monotonic approximation curve $K_{n+1,t}$ occurs, which thus represents an $(n+1)^{th}$ monotonic approximation relation $N_{n+1}(PR_{j=t})$ for the non-monotonic price-performance relation $PR_{j=t}$. In each step 905, on the basis of the z price-performance relations $PR_j$, wherein the approximation relation $N_{n+1}(PR_{j=t})$ is used instead of the price-performance relation $PR_{j=t}$, a determination of an $(n+1)^{th}$ equilibrium performance $m_{n+1}$ and of an associated equilibrium price $p_{n+1}$ for the system occurs. In a step 906, a repetition of steps 904 and 905 occurs for the iterative determination of an approximation relation $N_{n+1}(PR_{j=t})$, which satisfies a predetermined best match criterion. In a step 907, a control of individual components or of all the components of the system occurs, on the basis of a predetermined energy demand of the loads $L_b$, and of the equilibrium performance $m_{n+1}$, determined on the basis of the approximation relation $N_{n+1}(PR_{j=t})$, and of the equilibrium price $p_{n+1}$.

Figure 10:
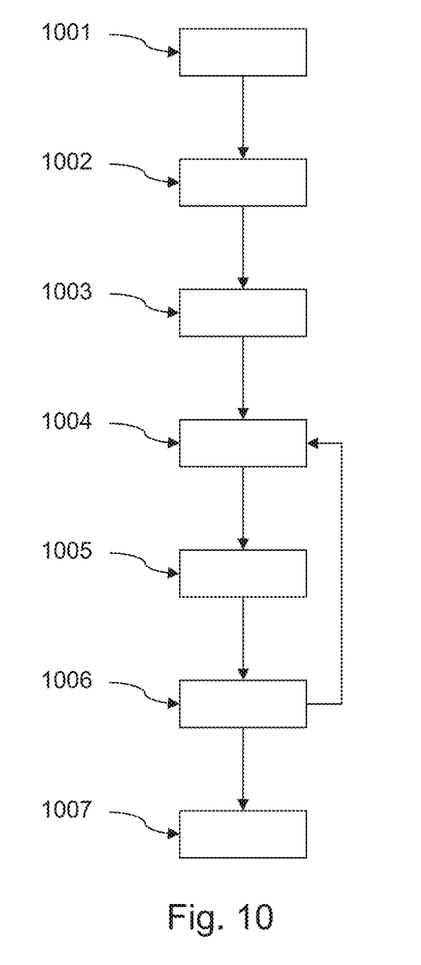
FIG. 10 shows a diagrammatic structure of a device according to the invention.

FIG. 10 shows a diagrammatic structure of a device according to the invention for the energy management of a system according to an economic market model approach, and for carrying out a method according to the invention, wherein the system comprises a number z of components which comprise at least: one number e of energy sources $Q_a$ and one number f of loads $L_b$, where: $a \in 1, 2, \ldots, a1$; $b \in 1, 2, \ldots, b1$; $z=a1+b1$ and $j, t \in 1, 2, \ldots, z$; comprising a first means 1001, by means of which it is possible to assign to each one of the z components of the system an individual price-performance relation $PR_j$ which assigns prices to performances delivered or received by the respective $j^{th}$ component, wherein each one of the price-performance relations $PR_j$ is represented by a curve in which performance values $m_j$ delivered or received by the respective $j^{th}$ component are plotted above price values $p_j$, wherein at least one such price-performance relation $PR_{j=t}$ is represented by such a non-monotonic curve $k_t^*$, and all additional price-performance relations $PR_{j \neq t}$ are represented by such monotonic curves $k_{j \neq t}$, a second means 1002, which is designed and arranged in order to approximate the non-monotonic curve $k_t^*$ by a first monotonic approximation curve $K_{n=1,t}$ which thus represents a first monotonic approximation relation $N_{n=1}(PR_{j=t})$ for the non-monotonic price-performance relation $PR_{j=t}$, a third means 1003, which is designed and arranged in order to determine, on the basis of the z price-performance relations $PR_j$, wherein the first approximation relation $N_{n=1}(PR_{j=t})$ is used instead of the price-performance relation $PR_{j=t}$, a first equilibrium price $p_{n=1}$ and an associated equilibrium performance $m_{n=1}$ for the system, a fourth means 1004, which is designed and arranged in order to approximate the non-monotonic curve $k_t^*$ by an additional monotonic approximation curve $K_{n+1,t}$ which thus represents an $(n+1)^{th}$ monotonic approximation relation $N_{n+1}(PR_{j=t})$ for the non-monotonic price-performance relation $PR_{j=t}$, a fifth means 1005, which is designed and arranged in order to determine, on the basis of the z price-performance relations $PR_j$, wherein the approximation relation $N_{n+1}(PR_{j=t})$ is used instead of the price performance relation $PR_{j=t}$, an $(n+1)^{th}$ equilibrium performance $m_{n+1}$ and an assigned equilibrium price $p_{n+1}$ for the system, a sixth means 1006 which is connected to the fourth (1004) and fifth (1005) means, designed in order to determine iteratively an approximation relation $N_{n+1}(PR_{j=t})$ which satisfies a predetermined best match criterion, and a seventh means 1007, which is designed and arranged in order to control individual components or all the components of the system on the basis of a predetermined energy demand of the loads $L_b$, and of an equilibrium performance $m_{n+1}$, determined on the basis of the approximation relation $N_{n+1}(PR_{j=t})$, and of the equilibrium price $p_{n+1}$.

Although the invention has been explained and illustrated in further detail using preferred embodiment examples, the invention is not limited to the disclosed examples, and the person skilled in the art can derive other variations therefrom without going beyond the scope of protection of the invention. Therefore, it is clear that a plurality of variation possibilities exist. It is also clear that the embodiments mentioned as examples really represent only examples that in no way can be interpreted as limiting, for example, the scope of protection, the application possibilities, or the configuration of the invention. Rather, the present description and the description of the figures make it possible for the person skilled in the art to effectively implement the embodiments given as examples, where the person skilled in the art, in the knowledge of the disclosed inventive idea, can make numerous changes, for example, with regard to the function or the arrangement of individual elements mentioned in an embodiment example, without leaving the scope of protection which is defined by the claims and their legal equivalents, such as further explanations provided in the description.

The invention claimed is:

1. A method for the energy control of a system, wherein the system comprises a number z of components which comprise at least: one number e of energy sources $Q_a$ and a number f of loads $L_b$, where: $a \in 1, 2, \ldots, a1$; $b \in 1, 2, \ldots, b1$; $z=a1+b1$ and $j, t \in 1, 2, \ldots, z$; with the following steps:
   1.1. assigning an individual price-power relation $PR_j$ to each of the z components of the system, which assigns prices to power delivered or received by the respective $j^{th}$ component, wherein each one of the price-power relations $PR_j$ is represented by a curve $k_j$, in which power values $m_j$ delivered or received by the respective $j^{th}$ component are plotted above price values $p_j$, wherein at least one such price-power relation $PR_{j=t}$ is represented by such a non-monotonic curve $k_t^*$, and all additional price-power relations $PR_{j \neq t}$ are represented by such monotonic curves $k_{j \neq t}$,
   1.2. approximating the non-monotonic curve $k_t^*$ by a first monotonic approximation curve $K_{n=1,t}$, which thus represents a first monotonic approximation relation $N_{n=1}(PR_{j=t})$ for the non-monotonic price-power relation $PR_{j=t}$, wherein n is a step counter,
   1.3. on the basis of the z price-power relations $PR_j$, wherein the first monotonic approximation relation $N_{n=1}(PR_{j=t})$ is used instead of the price-power relation $PR_{j=t}$, determining a first equilibrium price $p_{n=1}$ and an assigned equilibrium power $m_{n=1}$ for the system,
   1.4. approximating the non-monotonic curve $k_t^*$ by an additional monotonic approximation curve $K_{n+1,t}$, which thus represents an $(n+1)^{th}$ monotonic approximation relation $N_{n+1}(PR_{j=t})$ for the non-monotonic price-power relation $PR_{j=t}$,
   1.5. on the basis of the z price-power relations $PR_j$, wherein the approximation relation $N_{n+1}(PR_{j=t})$ is used instead of the price-power relation $PR_{j=t}$, determining an $(n+1)^{th}$ equilibrium power $m_{n+1}$ and an assigned equilibrium price $p_{n+1}$ for the system,
   1.6. repeating steps 1.4. and 1.5. for the iterative determination of the approximation relation $N_{n+1}(PR_{j=t})$, which satisfies a predetermined best match criterion,
   1.7. controlling the power output of individual or all of the energy sources $Q_a$ of the system on the basis of a current predetermined energy demand of the loads $L_b$, and a current equilibrium power $m_{n+1}$, and a current equilibrium price $p_{n+1}$ determined on the basis of the approximation relation $N_{n+1}(PR_{j=t})$.

2. The method according to claim 1, wherein the approximation curve $K_{n=1,t}$ is determined such that:

2.1. for all points $(m_{Kn=1,t}, p_{Kn=1,t})$ of the approximation curve $K_{n=1,t}$ it is the power value $m_{Kn=1,t}$ for a price $p_{Kn=1,t}$ is greater than or equal to all the power values $m_{kt}^*$ of the non-monotonic curve $k_t^*$ at this price $p_{Kn=1,t}$, and 2.2. the approximation curve $K_{n=1,t}$ is the curve which, under the above condition 2.1., has the smallest difference with respect to the non-monotonic curve $k_t^*$.

3. The method according to claim 1, wherein step 1.4. comprises the following steps:

3.1. for the last determined equilibrium power $m_n$, determining, on the basis of the non-monotonic curve $k_t^*$, a price value $p_{kt}^*(m_n)$ assigned to this equilibrium power $m_n$,    3.2. determining the approximation curve $K_{n+1,t}$ such that:

3.2.1. the approximation curve $K_{n+1,t}$ comprises the point $(m_n, p_{kt}^*(m_n))$,       3.2.2. for all points $(m_{Kn+1,t}, p_{Kn+1,t})$ of the approximation curve $K_{n+1,t}$ for which $p_{Kn+1,t} > p_{kt}^*(m_n)$, the power values $m_{Kn+1,t}$ assigned to the price values $p_{Kn+1,t}$ are smaller than or equal to the power values $m_{kt}^*$ of the non-monotonic curve $k_t^*$, whose power values $m_{kt}^*$ are greater than $m_n$,       3.2.3. for all points $(l_{kn+1,t}, p_{Kn+1,t})$ of the approximation curve $K_{n+1,t}$ for which $p_{Kn+1,t} < p_{kt}^*(m_n)$, the power values $m_{Kn+1,t}$ assigned to the price values $p_{Kn+1,t}$ are greater than or equal to the power values $m_{kt}^*$ of the non-monotonic curve $k_t^*$, and       3.2.4. the approximation curve $K_{n+1,t}$ is the curve which, under the above conditions 3.2.1. to 3.2.3., has the smallest difference with respect to the non-monotonic curve $k_t^*$.

4. The method according to claim 2, wherein step 1.4., to the extent that, for the last determined equilibrium power $m_n$, it is not possible to determine, on the basis of the non-monotonic curve $k_t^*$, a price value $p_{kt}^*(m_n)$ assigned to this equilibrium power $m_n$, the approximation curve $K_{n+1,t}$ is determined such that:

4.1. the non-monotonic curve $k_t^*$ is limited to a curve $k_{tb}^*$, wherein the latter curve contains only the points of the curve $k_t^*$, whose power values are either all greater than or all smaller than $m_n$, and    4.2. for determining the approximation curve $K_{n+1,t}$, steps 2.1. and 2.2. are applied, to the limited curve $k_{tb}^*$ instead of the non-monotonic curve $k_t^*$, wherein, in all the subsequent steps, $k_{tb}^*$ is now used instead of $k_t^*$.

5. The method according to claim 1, wherein the z components comprise: settable loads and/or switchable loads and/or settable and switchable loads and/or energy transformers and/or power limiters and/or power splitters and/or power change limiters and/or energy sinks and/or energy lines.

6. The method according to claim 1, wherein the system is an electrical system, a thermodynamic system, a mechanical system, a chemical system, a biological system, or a combination thereof.

7. The method according to claim 6, wherein the electrical system is an electrical system of a vehicle, ship, airplane, or spacecraft.

8. The method according to claim 6, wherein the thermodynamic system is an air conditioning system, heating system, or cooling system.

9. The method according to claim 1, wherein the individual price-power relations $PR_j$ are time dependent.

10. The method according to claim 1, wherein the individual price-power relations $PR_j$ are dependent on a state of the system and/or on a state of the respective components.

11. The method according to claim 1, wherein the individual price-power relations $PR_j$ are dependent on the components of priorities that are assigned individually in each case, wherein the individual priorities are temporally variable, and the priorities are not identical at any time.

12. A device for the energy control in a system, wherein the system comprises a number z of components which comprise at least: one number e of energy sources $Q_a$ and one number f of loads $L_b$, where: $a \in 1, 2, \ldots, a1$; $b \in 1, 2, \ldots, b1$; $z = a1 + b1$ and $j, t \in 1, 2, \ldots, z$, the device comprising:

10.1. a first means for assigning to each one of the z components of the system an individual price-power relation $PR_j$ which assigns prices to power delivered or received by the respective $j^{th}$ component, wherein each one of the price-power relations $PR_j$ is represented by a curve $k_j$, in which power values $m_j$ delivered or received by the respective $j^{th}$ component are plotted above price values $p_j$, wherein at least one such price-power relation $PR_{j=t}$ is represented by such a non-monotonic curve $k_t^*$, and all additional price-power relations $PR_{j \neq t}$ are represented by such monotonic curves $k_{j \neq t}$;

10.2. a second means for approximating the non-monotonic curve $k_t^*$ by a first monotonic approximation curve $K_{n=1,t}$ which thus represents a first monotonic approximation relation $N_{n=1}(PR_{j=t})$ for the non-monotonic price-power relation $PR_{j=t}$, wherein n is a step counter;

10.3. a third means for determining, on the basis of the z price-power relations $PR_j$, wherein the first approximation relation $N_{n=1}(PR_{j=t})$ is used instead of the price-power relation $PR_{j=t}$, a first equilibrium price $p_{n=1}$ and an associated equilibrium power $m_{n=1}$ for the system;

10.4. a fourth means for approximating the non-monotonic curve $k_t^*$ by an additional monotonic approximation curve $K_{n+1,t}$ which thus represents an $(n+1)^{th}$ monotonic approximation relation $N_{n+1}(PR_{j=t})$ for the non-monotonic price-power relation $PR_{j=t}$;

10.5. a fifth means for determining, on the basis of the z price-power relations $PR_j$, wherein the approximation relation $N_{n+1}(PR_{j=t})$ is used instead of the price power relation $PR_{j=t}$, an $(n+1)^{th}$ equilibrium power $m_{n+1}$ and an assigned equilibrium price $p_{n+1}$ for the system;

10.6. a sixth means connected to the fourth and fifth means, the sixth means for determining iteratively the approximation relation $N_{n+1}(PR_{j=t})$ which satisfies a predetermined best match criterion; and    10.7. a seventh means for controlling the power output of individual or all of the energy sources $Q_a$ of the system on the basis of a current predetermined energy demand of the loads $L_b$, and of the current equilibrium power $m_{n+1}$ and the current equilibrium price $p_{n+1}$ determined on the basis of the approximation relation $N_{n+1}(PR_{j=t})$.

* * * * *